United States Patent [19]

Nishikori et al.

[11] 4,437,703
[45] Mar. 20, 1984

[54] SEAT BACK RECLINING MECHANISM

[75] Inventors: Tsutomu Nishikori; Yasuo Yoshiki, both of Hiroshima, Japan

[73] Assignees: Toyo Kogyo Co., Ltd.; Delta Kogyo Co., Ltd., both of Hiroshima, Japan

[21] Appl. No.: 303,513

[22] Filed: Sep. 18, 1981

[30] Foreign Application Priority Data

Sep. 20, 1980 [JP] Japan ................... 55-131379

[51] Int. Cl.³ .................. A47C 1/024; E05D 11/10
[52] U.S. Cl. ........................... 297/362; 16/344
[58] Field of Search ................. 297/366–369, 297/362, 361, 354, 355; 16/325, 343, 344, 347, 333

[56] References Cited

U.S. PATENT DOCUMENTS

| 3,953,069 | 4/1976 | Tamura et al. | 297/367 |
| 3,966,253 | 6/1976 | Berghof et al. | 297/367 |
| 4,335,917 | 6/1982 | Izuno et al. | 297/366 |

Primary Examiner—William E. Lyddane
Attorney, Agent, or Firm—Fleit, Jacobson, Cohn & Price

[57] ABSTRACT

Seat back reclining mechanism having a coarse adjustment device and a fine adjustment device. The fine adjustment device includes an eccentric cam which may be mounted about a pivot pin for connecting a stationary plate secured to the seat bottom with a movable plate secured to the seat back. In the fine adjustment device, there is provided a locking device which prevents the eccentric cam from rotation. A fine adjustment lever functions when actuated to at first unlock the eccentric cam and then to make it rotate to perform a fine adjustment. .

9 Claims, 18 Drawing Figures

SEAT BACK RECLINING MECHANISM

The present invention relates to a seat back reclining mechanism for car seats and more particularly to a seat back reclining mechanism having coarse and fine adjusting devices.

Hithertofore, various proposals have been to provide seat back reclining mechanisms for adjusting inclination angles of seat backs with coarse and fine adjusting facilities. For example, Japanese utility model publication No. 45-5464 discloses a seat back reclining mechanism including a stationary locking plate secured to the seat bottom frame and a movable or swingable locking arm pivotably mounted on the seat back frame. The stationary locking plate is formed with a series of indentations whereas the swingable locking arm is provided with a pin which is adapted for engagement with selected one of the indentations in the stationary locking plate. An actuating lever is provided for actuating the pin on the swingable locking arm into and out of engagement with the indentation in the stationary locking plate to perform coarse adjustment of the seat back inclination. The seat back frame is pivotably connected with the seat bottom frame through an eccentric shaft so that the inclination angle of the seat back can be adjusted steplessly by rotating the eccentric shaft to perform a fine adjustment.

In the reclining mechanism disclosed in the Japanese utility model publication, the position of the seat back can be maintained by the frictional force on the eccentric shaft. The publication teaches that by appropriate dimensions of the eccentric shaft it is possible to maintain the seat back in an adjusted position against the load which may possibly be applied thereto in use while permitting manual rotation of the eccentric shaft for fine adjustments. It should however be pointed out that in actual practice it is extremely difficult to maintain the position of the seat back only by the frictional force on the eccentric shaft and there is a strong possibility that the seat back is undesirably be moved from the adjusted position under vibration load or repeated load applied thereto by a passenger.

It is therefore an object of the present invention to provide a seat back reclining mechanism having a coarse and fine adjusting devices, in which the position of the seat back can positively be maintained against the load possibly applied thereto in use.

Another object of the present invention is to provide a seat back reclining mechanism with a stepwise fine adjusting mechanism.

According to the present invention, the above and other objects can be accomplished by a seat back reclining mechanism for a car seat including a seat bottom and a seat back which is connected with the seat bottom for adjustment in an inclination angle with respect to the seat bottom, said reclining mechanism including adjusting movement producing means for producing a seat back inclination angle changing movement, actuating means for operating said adjusting movement producing means, locking means for locking said adjusting movement producing means, interconnecting means for interconnecting the locking means with the actuating means so that said locking means is actuated through said actuating means to unlock said adjusting movement producing means to thereby allow movement of the adjusting movement producing means whereby the inclination angle of the seat back can be adjusted through operation of the actuating means in one direction.

The adjusting movement producing means may be in the form of cam means which is provided for rotation so that the rotation of the cam means produces a change in the inclination angle of the seat back. The seat bottom and the seat back respectively have arm members which are connected together for a pivotable movement about a pivot axis and the cam means may be provided about the pivot axis. Alternatively, second locking means may be provided for locking the arm members on the seat bottom and the seat back and the cam means may be so arranged that it actuates the second locking means to make it possible to angularly move the arm member on the seat back with respect to the arm member on the seat bottom.

In another aspect of the present invention, there is further provided a seat back reclining mechanism for a car seat including a seat bottom and a seat back, said reclining mechanism including a stationary plate adapted to be attached to the seat bottom, a movable plate adapted to be attached to the seat back and pivotably connected with said stationary plate through eccentric shaft means, a locking plate mounted on one of said stationary and movable plates and having gear teeth, the other of said stationary and movable plates being formed with gear teeth which are adapted for engagement with the gear teeth on the locking plate, said locking plate being movable between a locking position wherein the gear teeth on the locking plate engage with the gear teeth on said other of the stationary and movable plates and an unlocking position wherein the gear teeth are disengaged, a coarse adjustment member for actuating the locking lever so that the movable plate is adjusted in angular relation with respect to the stationary plate, fine adjusting means for rotating said eccentric shaft means for effecting fine adjustment of the angular relation of the movable plate with respect to the stationary plate, said stationary plate being formed with a plurality of indentations, means interconnected with said fine adjusting means for engagement with said indentations so that the movable plate can be stepwisely adjusted in the angular relation with respect to the stationary plate.

The above and other objects and features of the present invention will become apparent from the following descriptions of preferred embodiments taking reference to the accompanying drawings, in which.

Figure 1:
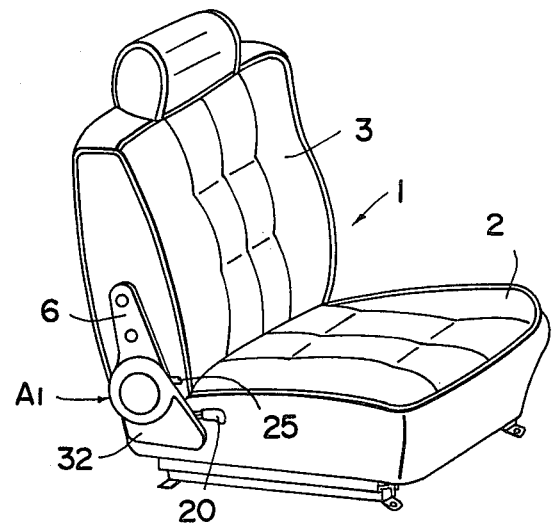
FIG. 1 is a perspective view of a car seat having a reclining mechanism in accordance with one embodiment of the present invention.

Referring now to the drawings, particularly to FIG. 1, there is shown a seat 1 for an automobile including a seat bottom 2 and a seat back 3. Between the seat bottom 2 and the seat back 3, there is provided a seat back reclining mechanism $A_1$. Referring to FIGS. 2 through 5, the reclining mechanism $A_1$ includes a pair of stationary plates 4 and 5 which are adapted to be secured to one side of a seat bottom frame in the seat bottom 2. A movable plate 6 having an arm portion 6a is secured at one end portion to one side of a seat back frame in the seat back 3 by means of screws 13 inserted into screw holes 6b in the arm portion 6a. The other end of the movable plate 6 is disposed between the plates 4 and 6 and formed with a circular hole 6c. Further, the other end of the movable plate 6 has sector gear teeth 6d and a smooth edge 6e continuous with the sector gear teeth 6d.

A locking plate 9 is disposed between the pair of stationary plates 4 and 5 and has at one end portion gear teeth 9a which are adapted for engagement with the sector gear teeth 6d. At the other end portion of the locking plate 9, there is formed a slot 9b which has a major axis extending substantially transversely with respect to the row of the gear teeth 9a. Between the stationary plate 4 and the locking plate 9, there is disposed a coarse adjustment lever 7 which is formed at one end portion with a circular hole 7a having the same diameter as the circular hole 6c in the movable plate 6. The lever has a knob 20 at the other end. The lever 7 is formed at the intermediate portion with an arcuate slit 7b and a pin hole 7c. At the outside of the stationary plate 4, there is disposed a fine adjustment lever 8 which has a circular hole 8a at one end and an actuating knob 25 at the other end.

The stationary plates 4 and 5 are respectively formed with circular holes 4a and 5a which are adapted to be placed in superposed relation with the circular holes 6c, 7a and 8a. Further, the stationary plates 4 and 5 are formed with holes 4b and 5b which are adapted to be aligned with the slot 9b in the locking plate 9. The stationary plates 4 and 5 are secured to the seat bottom frame by means of screws 12 which are inserted through screw holes 4c and 5c in the plates 4 and 5.

Figure 5:
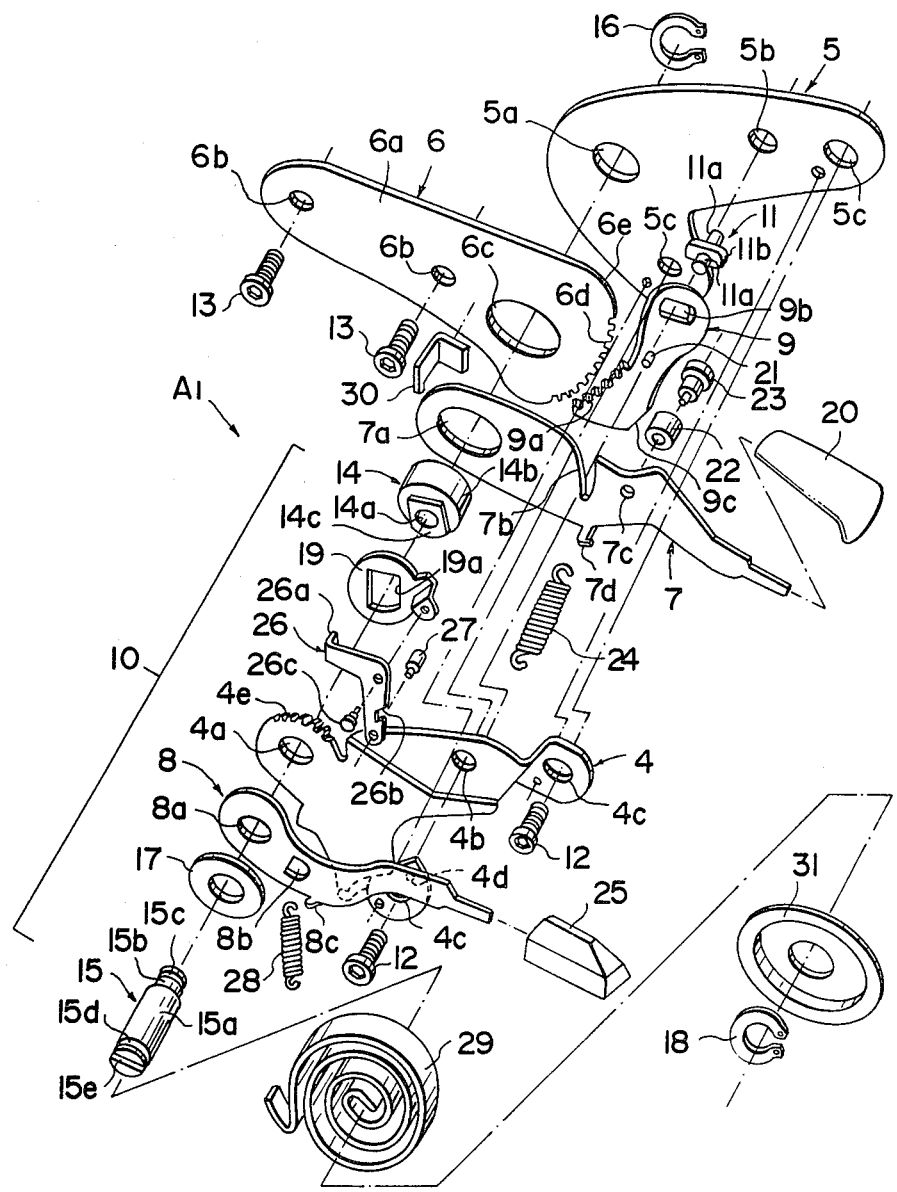
FIG. 5 is an exploded perspective view of the seat back reclining mechanism.

The movable plate 6 is pivotably connected with the stationary plates 4 and 5 by means of an eccentric shaft assembly 10 which is engaged with the holes 4a, 5a and 6a in the plates 4, 5 and 6. The eccentric shaft assembly 10 is also engaged with the holes 7a and 8a in the adjusting levers 7 and 8. As shown in FIG. 5, the eccentric shaft assembly 10 includes an eccentric member 14 having an axial hole 14a and a cylindrical surface 14b which is eccentric with respect to the axial hole 14a. A substantially rectangular land 14c is formed at one axial end of the eccentric member 14 for the purpose which will be described later. The eccentric member 14 is engaged with the circular hole 6c in the plate 6 and the circular hole 7a in the lever 7 at the cylindrical surface 14b. A pivot pin 15 is inserted through the axial hole 14a in the eccentric member 14. The pivot pin 15 has a large diameter shank 15a which is adapted to be engaged with the hole 14a in the eccentric member 14 and a small diameter portion 15b extending axially from one end of the shank 15a. The pivot pin 15 is formed at the small diameter portion 15b with a circumferential groove 15c. The small diameter portion 15b of the pivot pin 15 is inserted into the hole 5a, in the stationary plate 5 and held in position by a C-ring clip 16 which is engaged with the groove 15c in the pivot pin 15. The large diameter shank 15a is formed in the vicinity of the other end with a circumferential groove 15d and at the said other end with a diametrical slit 15e. The shank 15a is inserted through the hole 4a in the stationary plate 4 and the hole 8a in the lever 8 and a C-ring clip 18 is engaged with the groove 15d.

A cam actuating lever 19 having a substantially rectangular aperture 19a is engaged with the eccentric member 14 by fitting the aperture 19a to the land 14c. An L-shaped interconnecting lever 26 having a claw 26a at one leg end and a notch 26b at the intermediate portion of the other leg is pivotably connected with the cam actuating lever 19 by means of a pivot pin 26c. The lever 26 is provided at the end portion of said other leg with a pin 27 which is adapted to be engaged with a substantially triangular or pentagonal guide slot 8b in the actuating lever 8. A tension spring 28 is provided to extend between the notch 26b in the lever 26 and a claw 8c formed in the lever 8 so as to bias the lever 26 in a direction that the claw 26a on the lever 26 is forced toward the stationary plate 4. The plate 4 is formed with a sector gear or indentations 4e which are adapted to be engaged with the claw 26a so that the cam actuating lever 19 and therefore the eccentric member 14 are locked against rotation. When the lever 8 is actuated in the direction shown by an arrow X or Y in FIG. 3, the slope of the guide slot 8b in the lever 8 forces the lever 26 clockwise against the influence of the spring 28 to thereby move the claw 26a away from the indentations 4a on the plate 4 so as to release or unlock the eccentric member 14. Further movement of the lever 8 then causes a rotation of the eccentric member 14. As soon as the lever 8 is released, the lever 26 is returned under the force of the spring 28 until the claw 26a is engaged with one of the indentations 4e.

The movable plate 6 is engaged with an outer end of a spiral spring 29 which has an inner end engaged with the slit 15e in the pin 15. Thus, the plate 6 is normally forced clockwise in the plane of FIG. 2 so that the seat back is biased toward the upright position. Between the spiral spring 29 and the lever 8, there is provided a washer 17, and the spring 29 is covered by a plate 31.

The locking plate 9 is mounted on the stationary plates 4 and 5 by means of a slidable support 11 which includes a pair of axially aligned pin portions 11a and a slidable plate portion 11b between the pin portions 11a. The pin portions 11a are respectively engaged with the holes 4b and 5b in the plates 4 and 5 and the slidable plate portion 11b is slidably engaged with the slot 9b in the lever 9. Thus, the locking plate is rotatable about the pin portions 11a and slidable toward and away from the plate 6. The locking plate 9 has a pin 21 which is engaged with the arcuate slot 7b so that when the lever 7 is moved toward the direction shown by an arrow B in FIG. 2 the locking plate 9 is swung counterclockwise in the plane of FIG. 2 to have the gear teeth thereon disengaged from the gear teeth 6d on the movable plate 6. Thus, the movable plate 6 is unlocked and it becomes possible to perform a course adjustment of the inclination of the seat back.

The lever 7 carries a roller mounted on a pin 23. The roller 22 is adapted to ride on a lobe 9c formed on the locking plate 9 when the lever 7 is moved in the direction shown by an arrow C in FIG. 2 so as to make the gear teeth 9a engage with the gear teeth 6d to thereby lock the movable plate 6. A tension spring 24 is provided between a claw 4d on the plate 4 and a claw 7d on the lever 7 to bias the lever 7 in the direction of the arrow C to maintain the locking plate 9 in the locking position.

Figure 2:
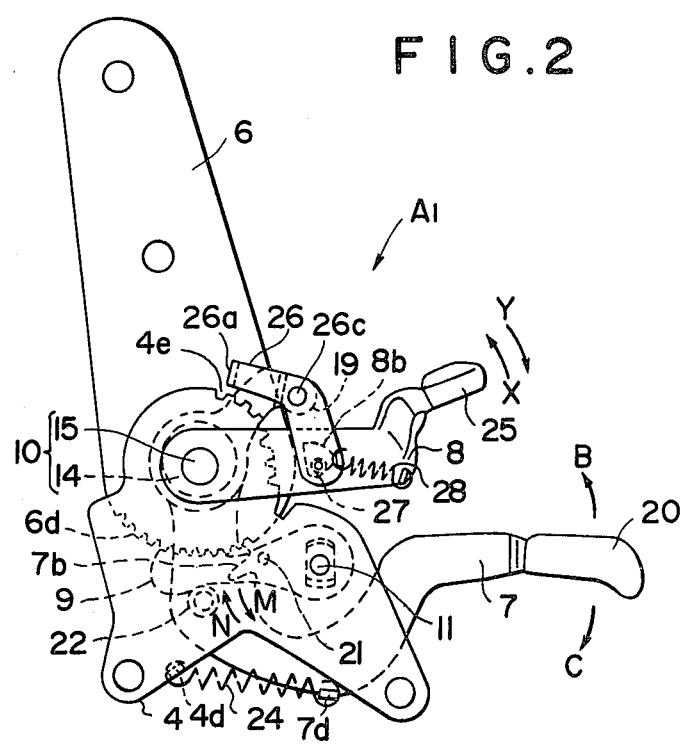
FIG. 2 is a side view of a seat back reclining mechanism.
Figure 3:
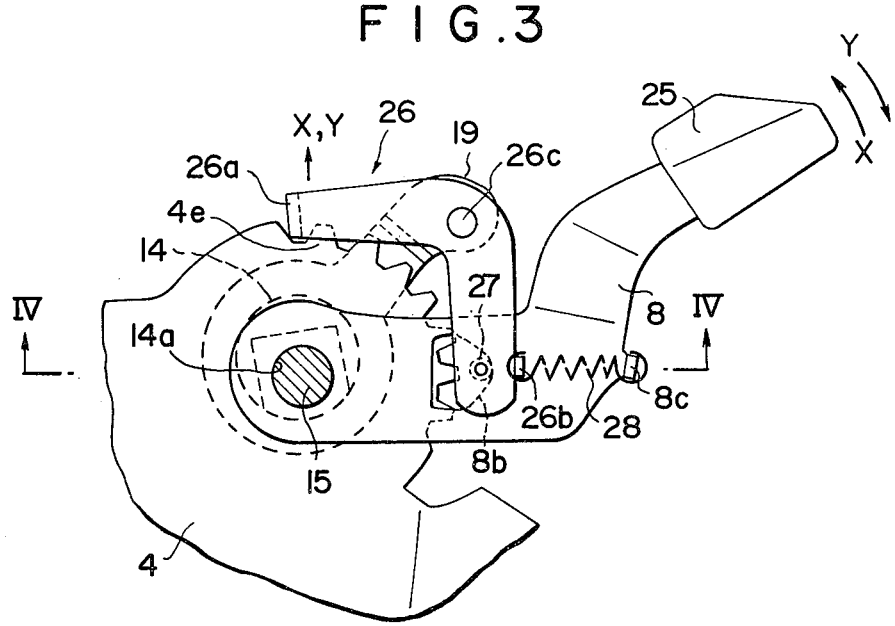
FIG. 3 is an enlarged fragmentary side view showing a part of the seat back reclining mechanism.
Figure 4:
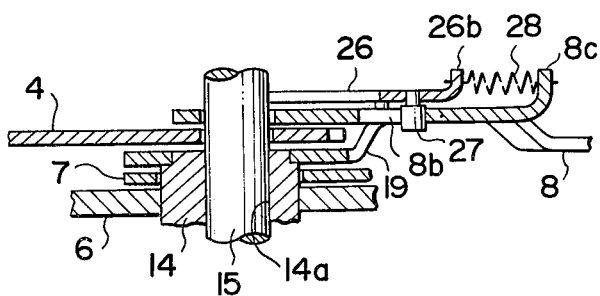
FIG. 4 is a sectional view taken substantially along on line IV—IV in FIG. 3.

It will therefore be understood that in operation a coarse adjustment of the seat back inclination can be performed by unlocking the movable plate 6 through an actuation of the lever in the direction of the arrow B in FIG. 2. The locking plate 9 is swung toward the unlocking direction as soon as the lever 7 is thus actuated through the engagement between the slot 7b and the pin 21. Then, the seat back 3 may be further tilted against the influence of the spiral spring 29 or moved toward the upright position under the influence of the spring 29. At the desired seat back inclination, the lever 7 is released to return to the locking position under the action of the spring 24 to thereby force the locking plate toward the locking position.

When it is desired to tilt the seat back 3 forwardly to provide an entrance to the rear seat as often required in two door cars, the lever 7 is moved in the direction of the arrow C to move the locking lever 9 in the unlocking direction. Then, the stationary plate 6 and therefore the seat back 3 are forced by the spiral spring 29 to the forwardly tilted position. When the lever 7 is released in this position, the gear teeth 9a on the locking plate 9 ride on the smooth edge 6e on the plate 6. The seat back 3 may then be moved rearwardly until the gear teeth 9a engage the gear teeth 6d in the upright position of the seat back 3. In this course of operation, a slidable movement is produced between the slot 9b in the locking plate 9 and the slidable portion 11b of the pivot pin 11.

To carry out a fine adjustment of the seat back inclination, the lever 8 is moved in either of the directions X and Y. The pin 27 then moves along a slope of the guide slot 8b in the lever 8 with the result that the lever 26 is rotated clockwise about the pin 26c to thereby move the claw 26a away from the sector gear 4e. As the lever 8 is further moved in the same direction after the pin 27 has arrived at an end of the guide slot 8b, the cam actuating lever 19 and the eccentric member 14 is rotated in the direction of the movement of the lever 8. Since the eccentric member 14 has the surface 14b which is eccentric with respect to the pin 15 and engaged with the hole 6c in the plate 6, the inclination angle of the plate 6 and that of the seat back 3 can be slightly changed as the eccentric member 14 is rotated with the gear teeth 6d engaged with the gear teeth 9a. In this course of operation, there may be slight movement in the locking plate 9, the movement being allowed by the slidable engagement of the portion 11b on the pin 11 with the slot 9b in the locking plate 9. The roller 22 on the lever 7 functions to maintain the engagement between the gear teeth 6d and the gear teeth 9a. In a desired position of the seat back 3, the lever 8 is released and the lever 26 is swung under the action of the spring 28 until the claw 26a is engaged with one of the indentations 4e. It should be noted that the engagement between the claw 26a and the indentation 4e serves to prevent undesirable rotation of the eccentric member 14 under a load which may be applied to the seat back 3 or to the plate 6 in use.

Figure 6:
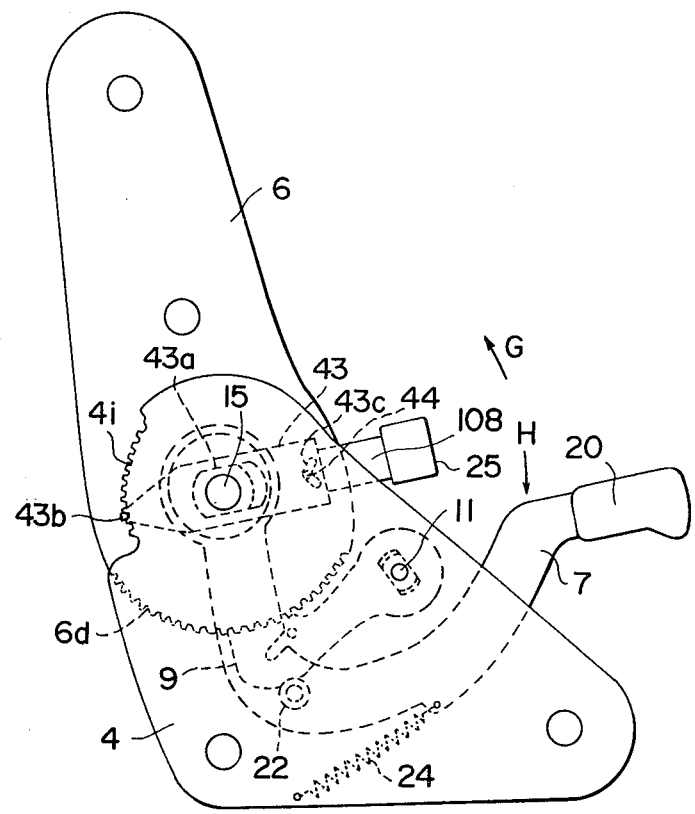
FIG. 6 is a side view of a seat back reclining mechanism in accordance with another embodiment of the present invention.
Figure 7:
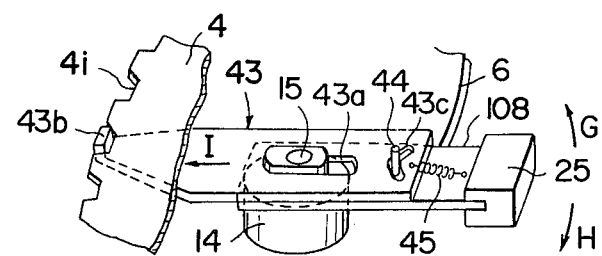
FIG. 7 is a fragmentary perspective view showing a part of the mechanism shown in FIG. 6.

Referring now to FIGS. 6 and 7 which show another embodiment of the present invention, the mechanism includes a fine adjustment lever 108 having an actuating knob 25 at one end. The lever 108 is rotatably connected at the other end with the pivot pin 15 as in the previous embodiment. The stationary bracket 4 is formed along an edge opposite to the knob 25 on the lever 108 with gear teeth or indentations 4i. An interconnecting plate 43 is mounted at an elongated slot 43a on the eccentric member 14 for axial sliding movement. The plate 43 has a claw 43b at one end for engagement with one of the indentations 4i. At the other end, the plate 43 is formed with a cam slot 43c which is engaged with a pin 44 provided on the lever 108. When the lever 108 is actuated in either of the directions shown by arrows G and H in FIGS. 6 and 7, the plate 43 is at first moved axially in the direction shown by an arrow I in FIG. 7 due to the engagement between the cam slot 43c and the pin 44 so that the claw 43b is disengaged from the indentation 4i. Further movement of the lever 108 causes a rotation of the plate 43 and the eccentric member 14 to carry out the fine adjustment of the seat back inclination.

Figure 8:
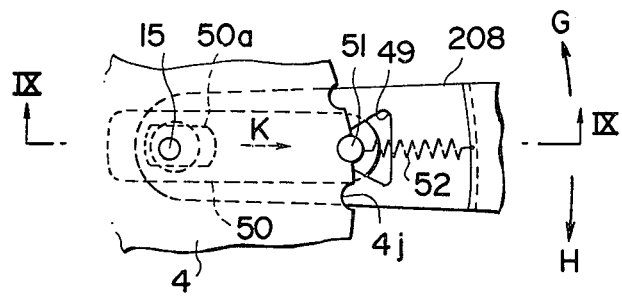
FIG. 8 is a fragmentary side view showing a further embodiment of the present invention.
Figure 9:
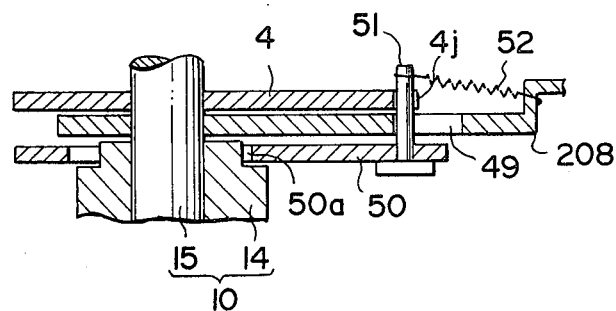
FIG. 9 is a sectional view taken along the line IX—IX in FIG. 8.

FIGS. 8 and 9 show a further embodiment which includes a fine adjustment lever 208 formed with a substantially triangular cam slot 49. The lever 208 is mounted at one end rotatably on the pivot pin 15. The stationary plate 4 is formed along an edge with indentations 4j. An interconnecting lever 50 is mounted on the eccentric member 14 for an axial slidable movement at an elongated slot 50a. The lever 50 has a pin 51 which passes through the cam slot 49 and is adapted to be engaged with one of the indentations 4j. Between the lever 208 and the pin 51, there is provided a compression spring 52 for urging the pin 51 toward the indentation 4j. In this structure, when the lever 208 is actuated in either of the directions shown by arrows G and H in FIG. 8, the pin 51 is at first moved under the action of the cam slot 49 in the direction shown by an arrow K in FIG. 8 so that the pin 51 is disengaged from the indentation 4j. Further movement of the lever 208 causes a rotation of the eccentric shaft 14 to perform a fine adjustment of the seat back inclination.

Figure 10:
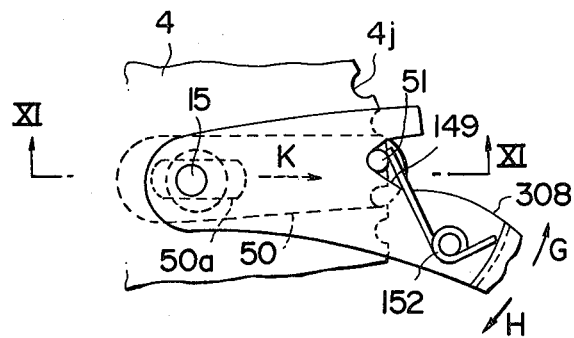
FIG. 10 is a fragmentary side view similar to FIG. 8 but showing another embodiment.
Figure 11:
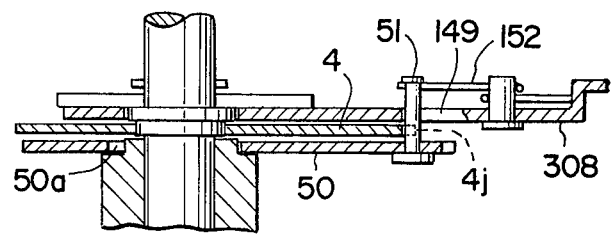
FIG. 11 is a sectional view taken along the line XI—XI in FIG. 10.

FIGS. 10 and 11 show a modification of the structure shown in FIGS. 8 and 9. In this structure, the fine adjustment lever 308 has a cam edge 149 which functions as the cam slot 49 in the previous embodiment. The compression spring 52 in the previous embodiment is substituted by a spring 152.

Figure 12:
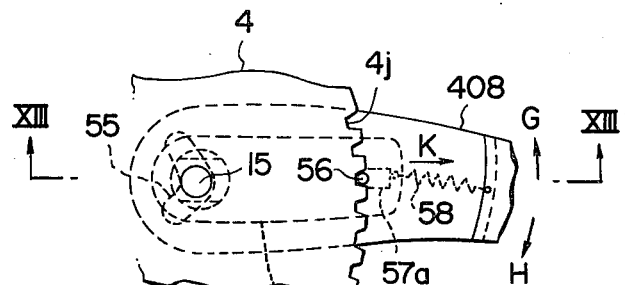
FIG. 12 is a fragmentary side view showing a further embodiment of the present invention.
Figure 13:
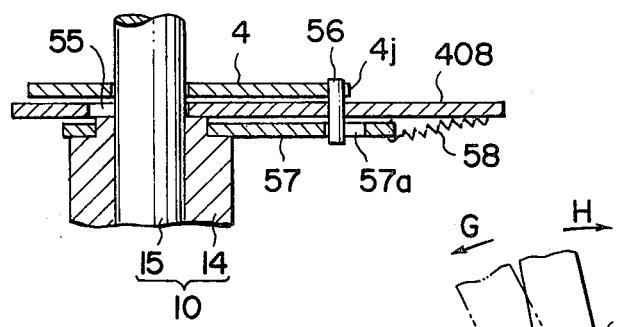
FIG. 13 is a sectional view taken along the line XIII—XIII in FIG. 12.

FIGS. 12 and 13 show a further embodiment of the present invention in which a fine adjustment lever 408 is formed at one end with a cam slot 55 with which the pivot pin 15 is engaged. The lever 408 has a pin 56 which is adapted to be engaged with one of the indentations 4j on the stationary plate 4. An interconnecting plate 57 is fixed at one end to the eccentric member 14 and formed at the other end with an axial slot 57a. The pin 56 on the lever 408 is engaged with the slot 57a. A tension spring 58 extends between the lever 408 and the plate 57 to bias the lever 408 toward the pivot shaft 15. When the lever 408 is moved in either of the directions shown by arrows G and H, the lever 408 is displaced axially in the direction shown by an arrow K so that the pin 56 on the lever 408 is disengaged from the indentation 4j. Further rotation of the lever 408 causes a rotation of the lever 57 and the eccentric member 14.

Figure 14:
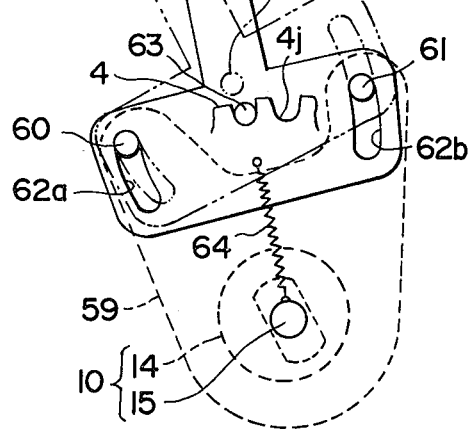
FIG. 14 is a fragmentary side view showing still further embodiment of the present invention.

Referring now to FIG. 14, there is shown another embodiment which includes an interconnecting plate 59 secured at one end to the eccentric member 14 and provided with a pair of pins 60 and 61 located symmetrically with respect to a diametrical line of the plate 59. A fine adjustment lever 62 has a pair of arcuate slots 62a and 62b for engagement respectively with the pins 60 and 61. The lever 62 further has a pin 63 which is adapted for engagement with one of the indentations 4j in the stationary plate 4. A tension spring 64 extends between the pivot pin 15 and the lever 62 so as to bias the pin 63 into engagement with the indentation 4j. When the lever 62 is actuated in either of the directions G and H, the lever 62 is turned about one of the pins 60 and 61 with the other pin sliding along the associated slots 62a or 62b, so that the pin 63 is disengaged from the indentation 4j. A further movement of the lever 62 causes a rotation of the plate 59 and the eccentric member 14.

Figure 15:
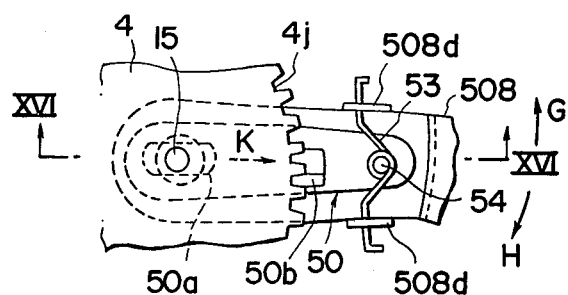
FIG. 15 is a fragmentary side view showing a further embodiment of the present invention.
Figure 16:
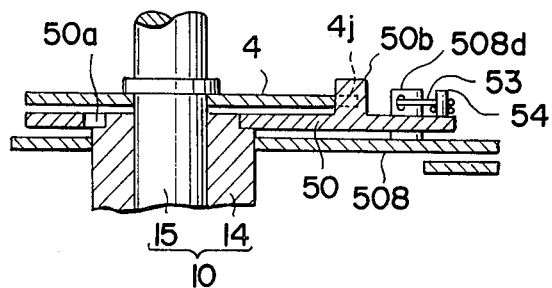
FIG. 16 is a sectional view taken along the line XVI—XVI in FIG. 15.

FIGS. 15 and 16 show an embodiment which is similar to the arrangements shown in FIGS. 8 through 11. In this embodiment, however, a fine adjustment lever 508 is rotatably connected with the eccentric member 14 and has a pair of lugs 508d formed at side edges thereof. An interconnecting lever 50 is mounted on the eccentric shaft 14 for a slidable movement in the radial direction of the pivot pin 15. The lever 50 is formed with an elongated slot 50a for the purpose. The lever 50 is further formed with an upright claw 50b which is adapted to be engaged with one of the indentations 4j formed in the stationary plate 4. A torsion spring 53 is mounted at the intermediate portion on a pin 54 provided on the lever 50 and has opposite ends engaged with the lugs 508d on the lever 508. As the lever 508 is actuated in either of the directions G and H in FIG. 15, the lever 50 is shifted under the action of the spring 53 in the direction shown by an arrow K so that the claw 50b is disengaged from the indentation 4j. Further movement of the lever 508 causes the lever 50 to rotate so that the eccentric member 14 is rotated with the lever 50.

Figure 17:
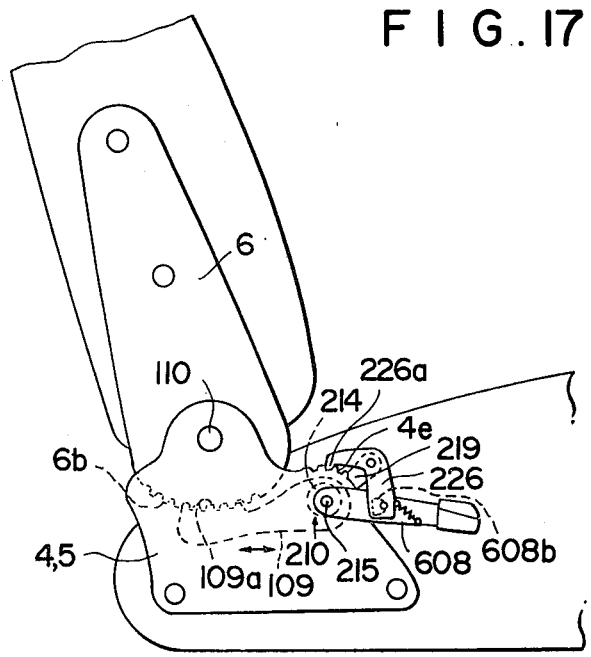
FIG. 17 is a side view showing a further embodiment of the present invention; and, FIG. 18 is a side view showing yet further embodiment of the present invention.

Referring to FIG. 17, there is shown a further embodiment of the present invention. In this embodiment, the stationary plates 4 and 6 are pivotably connected with the movable plate 6 by means of a conventional pivot pin 110. The plate 6 is formed at the lower edge portion with gear teeth 6b and a locking plate 109 is provided for determining the position of the movable plate 6. The locking plate 109 has gear teeth 109a for engagement with the gear teeth 6b on the plate 6 at one end portion thereof. At the other end, the locking plate 109 is mounted on the plates 4 and 5 through an eccentric shaft assembly 210. The eccentric shaft assembly 210 is constituted in the similar manner as the shaft assembly 10 in the embodiment shown in FIGS. 1 through 5 and comprises an eccentric member 214 and a pivot pin 215. A fine adjustment lever 608 is rotatably mounted on the pivot pin 215 and an interconnecting lever 226 and a cam actuating lever 219 are provided as in the embodiment of FIGS. 1 through 5. The lever 226 has a claw 226a at one end for engagement with one of indentations 4e formed on the plate 4. The other end of the lever 226 is connected with the lever 608 through a cam slot 608b in the lever 608. As in the embodiment of FIGS. 1 through 5, as the lever 608 is actuated in one direction, the claw 226a on the lever 226 is disengaged from the indentation 4e. A further movement of the lever 608 causes a rotation of the eccentric member 214 so that the locking member 109 is shifted to change the inclination of the movable plate 6. A coarse adjusting lever (not shown) is of course provided for changing the meshing engagement between the gear teeth 6b and 109a.

Figure 18:
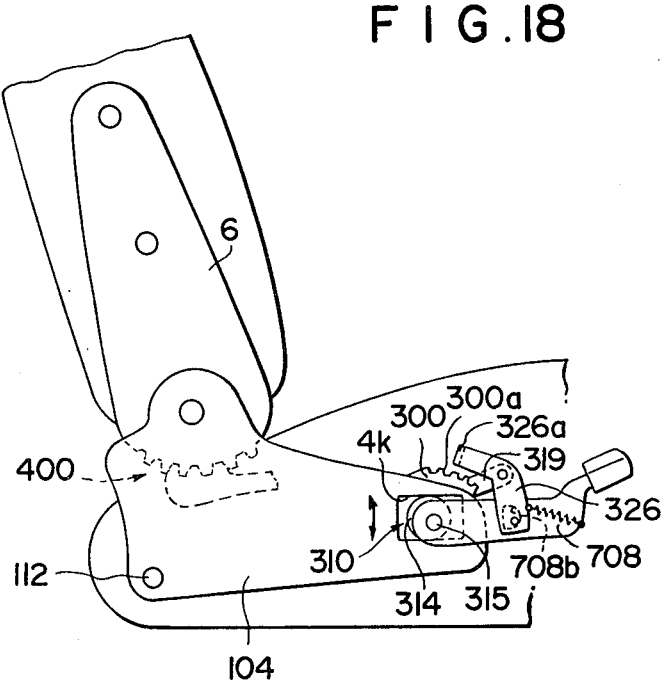

Referring to FIG. 18, there is shown a further embodiment of the present invention in which the seat back reclining mechanism includes a stationary plate 104 which is pivotably mounted on the seat bottom frame through a pivot pin 112. A movable plate 6 is secured to the seat back frame and connected at lower end portion with the stationary plate 6. Between the stationary plate 104 and the movable plate 6, there is provided a coarse adjustment mechanism in a conventional way as shown by a reference 400 in FIG. 18. At the front end portion of the plate 104, there is provided an rectangular opening 4K with which an eccentric shaft assembly 310 is engaged. A plate 300 having indentations 300a is secured to the seat bottom frame. The eccentric shaft assembly 310 is constructed in the similar manner as the assembly 10 in the embodiment of FIGS. 1 through 5 and comprises an eccentric member 314 and a pivot pin 315. A fine adjustment lever 708 is connected rotatably at one end and an interconnecting lever 326 and a cam actuating lever 319 are provided as in the embodiment of FIG. 18. The lever 326 has a claw 326a at one end for engagement with one of the indentations 300a on the plate 300. The other end of the lever 326 is connected with the lever 708 through a cam slot 708b in the lever 708. In this embodiment, an actuation of the lever 708 causes a swingable movement of the plate 104 through a rotation of the eccentric member 314.

The invention has thus been shown and described with reference to preferred embodiments, however, it should be noted that the invention is in no way limited to the details of the illustrated structures but changes and modifications may be made without departing from the scope of the appended claims.

We claim:

1. A seat back reclining mechanism for a car seat including a seat bottom and a seat back which is connected with the seat bottom for adjustment in an inclination angle with respect to the seat bottom, said reclining mechanism including stationary bracket means attached to said seat bottom, movable bracket means attached to said seat back and connected pivotably with said stationary bracket means, lock plate means movably connected with said stationary bracket means and having first gear teeth means, said movable bracket means having second gear teeth means, coarse, adjusting means for actuating said lock plate means so that said first gear teeth means is engaged with said second gear teeth means to thereby effect coarse adjustment of inclination angle of said movable bracket means, adjusting movement producing means for producing a seat back inclination angle changing movement, fine adjusting means for operating said adjusting movement producing means to effect fine adjustment of the inclination angle of said seat back, locking means for locking said adjusting movement producing means, interconnecting means for interconnecting the locking means with the fine adjusting means so that said locking means is actuated through said fine adjusting means to unlock said adjusting movement producing means when said fine adjusting means is actuated in one direction to thereby allow movement of the adjusting movement producing means whereby the inclination angle of the seat back can be adjusted through operation of the fine adjusting means in said one direction.

2. A seat back reclining mechanism in accordance with claim 1 in which said adjusting movement producing means includes cam means which is provided for rotation so that the rotation of the cam means produces a change in the inclination angle of the seat back.

3. A seat back reclining mechanism in accordance with claim 2 in which the stationary and movable bracket means respectively have arm members which are connected together for a pivotable movement about a pivot axis and the cam means is provided about the pivot axis.

4. A seat back reclining mechanism in accordance with claim 1 in which said interconnecting means includes projection means provided on one of the locking means and the fine adjusting means and guide means provided on the other, said guide means including guide surface means for engaging the projection means to thereby move said one of the locking means and the fine adjusting means in an unlocking direction.

5. A seat back reclining mechanism in accordance with claim 4 in which said adjusting movement producing means includes an eccentric cam rotatably mounted on plate means attached to the seat bottom so that a rotation of the cam means produces a change in the seat back inclination angle, said fine adjusting means being connected with said cam means so that it can produce a rotation of the cam means.

6. A seat back reclining mechanism in accordance with claim 5 which includes second plate means secured to the seat back, said second plate means being connected with the first plate means for a pivotable movement about a pivot axis, said cam means being provided about said pivot axis.

7. A seat back reclining mechanism in accordance with claim which further includes first and second plate means securely attached respectively to the seat bottom and the seat back and connected together for pivotable movement about a pivot axis, second locking means for locking the second plate means to the first plate means, said adjusting movement producing means including eccentric cam means rotatably mounted on the first plate means for causing a movement in the second locking means to thereby produce a change in an inclination angle of the second plate means.

8. A seat back reclining mechanism in accordance with claim which further includes first plate means secured to one of the seat back and the seat bottom, second plate means pivotably attached to the other, said first and second plate means being pivotably connected together, means for determining angular relationship between the first and second plate means, said adjusting movement producing means including eccentric cam means for producing a pivotable movement of the second plate means to thereby change the seat back inclination angle.

9. A seat back reclining mechanism for a car seat including a seat bottom and a seat back, said reclining mechanism including a stationary plate adapted to be attached to the seat bottom, a movable plate adapted to be attached to the seat back and pivotably connected with said stationary plate through eccentric shaft means, a locking plate mounted on one of said stationary and movable plates and having gear teeth, the other of said stationary and movable plates being formed with gear teeth which are adapted for engagement with the gear teeth on the locking plate, said locking plate being movable between a locking position wherein the gear teeth on the locking plate engage with the gear teeth on said other of the stationary and movable plates and an unlocking position wherein the gear teeth are disengaged, a coarse adjustment member for actuating the locking lever so that the movable plate is adjusted in angular relation with respect to the stationary plate, fine adjusting means for rotating said eccentric shaft means for effecting fine adjustment of the angular relation of the movable plate with respect to the stationary plate, said stationary plate being formed with a plurality of indentations, means interconnected with said fine adjusting means for engagement with said indentations so that the movable plate can be stepwisely adjusted in the angular relation with respect to the stationary plate.

* * * * *